June 25, 1963  K. A. DÜPPENGIESSER  3,095,228
BLADE FOR SOIL-WORKING IMPLEMENT
Filed Dec. 31, 1959
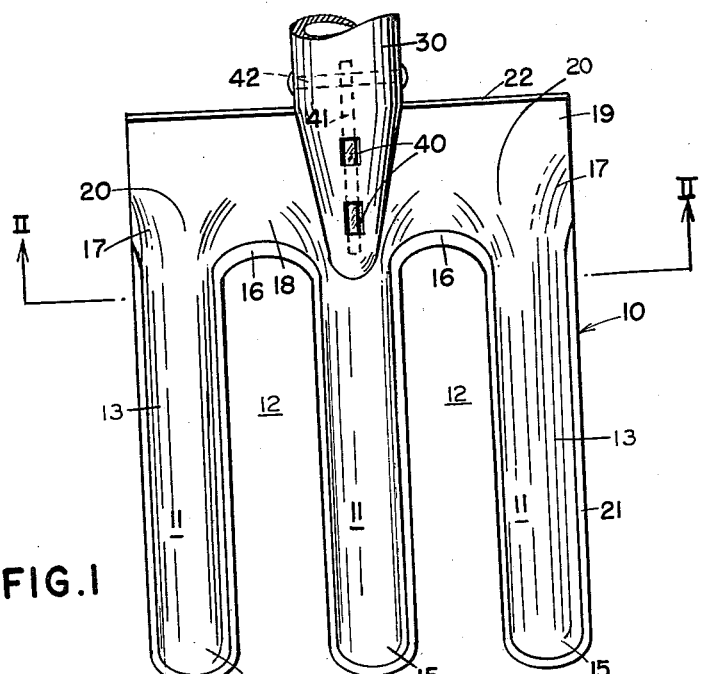
FIG.1
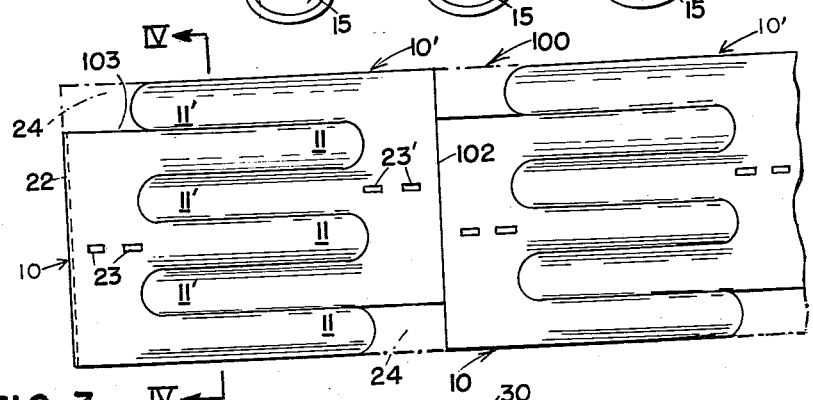
FIG.3
FIG.2
FIG.4
Karl August Düppengiesser
INVENTOR.
BY Karl F. Ross
AGENT.

3,095,228
BLADE FOR SOIL-WORKING IMPLEMENT
Karl August Düppengiesser, Unter der Charlottenberg 1,
Gera-Langenberg, Thuringen, Germany
Filed Dec. 31, 1959, Ser. No. 863,353
1 Claim. (Cl. 294—49)

My present invention relates to soil-working implements such as spades, shovels and the like.

Soil-working implements manufactured heretofore may broadly be defined as falling into two categories, one comprising implements for digging, trenching, irrigation work and allied uses, the other comprising implements primarily adapted to soil preparation, weeding, root grubbing and the like. Implements of the first category have generally employed a substantially flat blade, occasionally provided with one or more openings, having a relatively large earth-moving capacity, the openings permitting the passage of liquid encountered by the blade when the latter is employed in wet or moist soil. Weeding and grubbing instruments, on the other hand, have customarily been made with pointed and/or sharpened tines or prongs adapted to cut through roots and the like when the implement is used for surface treatment of soil. While the pointed implements are suitable for such application, they are unable to be used for trenching and digging; similarly, broad-bladed implements are unsuitable for soil preparation, weeding and root grubbing.

It is a general object of my invention, therefore, to provide a soil-working blade of relatively large earth-moving capacity yet adapted to be used for grubbing, soil preparation and irrigation work, even in wet or moist ground.

Another object of the present invention is the provision of a blade of this character adapted to be manufactured from sheet metal by a simple process and with a minimum of waste.

In accordance with a feature of my present invention, I provide a blade of generally rectangular configuration, adapted to be secured to the handle of a soil-working implement, which has a plurality of relatively broad tongues (preferably three in number) whose edges advantageously are sharpened all around. The broad tongues enable the implement to be used for earth displacement, their sharp edges permitting root grubbing and the like. Each tongue is transversely curved for increased rigidity, thus enabling the implement to be used in heavy-duty operations in which conventional tools would tend to bend by reason of the excessive flexibility of their tines or prongs.

Another feature of my invention resides in the provision of a blade having inter-tongue spaces of the same breadth as the tongues, whereby two such blades may be stamped from a single rectangular sheet-metal blank with their tongues interleaved to achieve maximum utilization of the blank.

The above and other objects, features and advantages of my invention will become more readily apparent from the following description, reference being made to the accompanying drawing in which:

FIG. 1 is a front-elevational view of a blade according to the invention;

FIG. 2 is a cross-sectional view taken along line II—II of FIG. 1;

FIG. 3 is a top-plan view of a sheet-metal blank used in the formation of blades according to the invention, prior to separation of the dovetailed blades; and FIG. 4 is a cross-sectional view taken along line IV—IV of FIG. 3.

In FIG. 1 I show a blade 10, adapted to be secured to a tubular handle socket 30, comprising three substantially rectangular, parallel tongues 11 whose ends 15 are rounded to facilitate the entrance thereof into the earth. Between the tongues 11 there are provided generally rectangular spaces 12 having the same breadth as the tongues 11. The heel 19 of the blade 10 is provided with suitable formations for affixing the socket 30 thereto, such as slots 23 adapted to receive prongs 40 of a link member 41 which is enclosed inside the hollow handle by a rivet 42, e.g. as more generally disclosed in my co-pending application Ser. No. 633,901, filed January 14, 1957, now Patent No. 2,956,831. As shown in FIG. 2, the tongues 11 are arcuate in cross-section and upwardly convex, thus forming troughs at 13. Heel 19 is substantially flat in its upper part and corrugated in its lower part, adjacent the tongues 11, its raised edge portions 17 and ridges 18 alternating with depressions 20 in line with troughs 13. The raised portions 17, 18 and the depressed portions 20 serve to increase the strength of the heel 19, even as the tongues 11 are strengthened against deformation by the longitudinally extending troughs 13. The spaces 12 terminate in concave edges 16 of the same curvature as the convex edges 15 on the free ends of tongues 11. The longitudinal edges 21 of tongues 11 as well as the rounded edges 15 and 16 are sharpened to enable the use of blade 10 in root cutting and similar operations.

The blade 10 may be formed in a single operation, simultaneously with the formation of a second blade 10', from a rectangular blank 100 (FIG. 3) outlined in dot-dash lines. Blade 10', whose tongues 11' dovetail with the tongues 11, is seen from the bottom thereof while blade 10 is seen from above. A cross-sectional view (FIG. 4) taken through the blade tongues 11, 11' reveals the corrugated formation thereof with troughs 13, 13' extending longitudinally of tongues 11 and 11', respectively. It will be apparent that the convex reverse sides of the tongues 11 or 11' of one blade terminate in the raised intermediate areas 18' or 18 of the other blade.

It will thus be apparent that one or more pairs of blades 10, 10' may be formed from a single blank 100 by suitable male and female dies adapted to cut or score the blank along one or more zig-zag lines 101 and straight lines 102, 103, whereby only small rectangles 24 are left over, and to form the raised and depressed portions of these blades in the same operation. The slots 23, 23' may also be punched out in the course of this formation step. Furthermore, the horizontal edge of the straight upper portion of heel 19 may be bent forwardly for greater rigidity, as shown at 22, while the sharpening of the tongue edges may be accomplished by so shaping the cutting edges of the dies as to produce incisions 25 of triangular cross-section on opposite sides of the blank, as best seen in FIG. 4.

The invention shown and described may be modified in various ways readily apparent to persons skilled in the art without departing from the spirit and scope of my present disclosure, except as further limited by the appended claim.

I claim:

A soil-working implement comprising a blade having a heel portion and a handle portion attached to said heel portion, said blade further having an odd number of identically shaped elongated tongues of generally rectangular configuration spacedly projecting integrally from said heel portion, said blade having a working surface to which said handle portion is secured in line with the middle one of said tongues while extending to and partly over the latter, said tongues terminating in rounded free ends and being surrounded by sharpened edges along an outline identical with that of the spaces separating them from one another, each of said tongues being formed over its entire length with an elongated trough which is concave on the side of said working surface and extends into said heel portion, said heel portion being provided with ridges convex on the side of said working surface on opposite sides of said handle portion in alignment with said spaces, said heel portion being further provided with a transverse edge remote from said free ends which is bent over toward said working surface to substantially the level of said ridges.

References Cited in the file of this patent

UNITED STATES PATENTS

| | | |
|---|---|---|
| 126,465 | Lake et al. | May 7, 1872 |
| 294,587 | Cowdery | Mar. 4, 1884 |
| 339,527 | Calef | Apr. 6, 1886 |
| 802,308 | Olson | Oct. 17, 1905 |
| 808,168 | Reed | Dec. 26, 1905 |
| 1,043,758 | Ferwerda | Nov. 5, 1912 |
| 1,755,651 | Kingsbury | Apr. 22, 1930 |

FOREIGN PATENTS

| | | |
|---|---|---|
| 830,902 | France | May 23, 1938 |
| 1,173 | Great Britain | Jan. 17, 1908 |
| 21,292 | Great Britain | Sept. 13, 1910 |